United States Patent
Katou

(10) Patent No.: US 10,396,648 B2
(45) Date of Patent: Aug. 27, 2019

(54) VOLTAGE ADJUSTING CIRCUIT AND METHOD FOR ADJUSTING VOLTAGE

(71) Applicant: NEC Corporation, Minato-ku, Tokyo (JP)

(72) Inventor: Toshihiro Katou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/841,591

(22) Filed: Dec. 14, 2017

(65) Prior Publication Data
US 2018/0183314 A1 Jun. 28, 2018

(30) Foreign Application Priority Data
Dec. 27, 2016 (JP) .................................. 2016-252477

(51) Int. Cl.
| H02M 5/46 | (2006.01) |
| H02M 1/00 | (2006.01) |
| G05F 1/10 | (2006.01) |
| G05F 1/46 | (2006.01) |

(52) U.S. Cl.
CPC ............ *H02M 1/00* (2013.01); *G05F 1/10* (2013.01); *G05F 1/46* (2013.01); *H02M 5/46* (2013.01); *H02M 2001/0022* (2013.01)

(58) Field of Classification Search
CPC ............. H02M 2001/0009; H02M 2001/0022; H02M 1/00; H02M 5/46
USPC .................................................. 327/551–553
See application file for complete search history.

(56) References Cited

U.S. PATENT DOCUMENTS

| 5,629,642 A | 5/1997 | Yoshimura | |
| 7,355,429 B2* | 4/2008 | Jenkins | G01R 19/16552 324/750.3 |
| 2001/0015882 A1* | 8/2001 | Yanagawa | H03K 19/0005 361/113 |
| 2004/0128115 A1* | 7/2004 | Chen | G01R 31/3004 702/191 |
| 2005/0185450 A1* | 8/2005 | Isoda | G11C 5/147 365/154 |
| 2005/0206641 A1* | 9/2005 | Morita | G09G 3/3696 345/211 |
| 2006/0221531 A1* | 10/2006 | Nagata | G01R 29/26 361/118 |
| 2007/0091701 A1* | 4/2007 | Sakai | G01R 31/31725 365/208 |

(Continued)

FOREIGN PATENT DOCUMENTS

| JP | H06-289942 A | 10/1994 |
| JP | H09-054620 A | 2/1997 |

(Continued)

OTHER PUBLICATIONS

Japanese Office Action for JP Application No. 2016-252477 dated Feb. 27, 2018 with English Translation.

*Primary Examiner* — Gary L Laxton
*Assistant Examiner* — Sisay G Tiku

(57) ABSTRACT

A voltage adjusting circuit includes a variable current generating means for generating a variable current to be supplied to a power source line, a decision voltage generating means for generating a decision voltage by using a power source voltage of the power source line, and power source noise detecting means for detecting power source noise of the power source line by using the power source voltage of the power source line and the decision voltage.

11 Claims, 10 Drawing Sheets

(56) References Cited

U.S. PATENT DOCUMENTS

| | | | |
|---|---|---|---|
| 2011/0032028 A1* | 2/2011 | Nakashima | H03K 19/0016 327/543 |
| 2011/0074385 A1* | 3/2011 | Sunaga | G01R 31/3016 324/76.11 |
| 2015/0084717 A1 | 3/2015 | Katoh | |
| 2016/0126953 A1* | 5/2016 | Ishii | H03K 19/0016 327/547 |
| 2017/0103803 A1* | 4/2017 | Ishii | G11C 11/417 |

FOREIGN PATENT DOCUMENTS

| | | |
|---|---|---|
| JP | 2013-037472 A | 2/2013 |
| JP | 2015-069993 A | 4/2015 |

* cited by examiner

VOLTAGE ADJUSTING CIRCUIT AND METHOD FOR ADJUSTING VOLTAGE

This application is based upon and claims the benefit of priority from Japanese Patent Application No. 2016-252477, filed on Dec. 27, 2016, the disclosure of which is incorporated herein in its entirety by reference.

TECHNICAL FIELD

The present invention relates to a voltage adjusting circuit and a method for adjusting voltage, particularly adjustment of a power source voltage.

BACKGROUND ART

In an apparatus which is assembled by using components, such as a Large Scale Integrated circuit (LSI), an Integrated Circuit (IC), a Package (PKG), a printed board, it is desirable that an operating voltage of the apparatus can be easily set to an optimum voltage.

A power source voltage is normally set to a standardized value which is described in specifications. In this case the voltage is set to the worst value in consideration of variation of manufacturing or change of environment. Variation in setting values of the power source voltage may be ±1% to 2% because of individual differences and environment. Since a power source standard of a common LSI/IC is −5% to +5%, the above-mentioned variation occupies 40% of the budget and is a large factor.

As one of methods for reducing the variation described above, a method for setting voltage is known, in which it is checked whether or not an apparatus can be operated in various operating patterns by using several voltages before shipment. This setting method, however, has an issue that operations need a lot of time, and the effect is limited because a voltage step needs to be increased. Further, this setting method has an issue that the voltage needs to be elevated in consideration of operational environment or aging deterioration because the above method needs to be conducted before shipment.

Therefore, there is an issue that the setting voltage needs to be raised in an apparatus, and this increases power consumption thereof.

Characteristics of a LSI, an IC, a PKG, a printed board, and the like change depending on manufacturing variation or environment. If the voltage is set before shipment, the voltage setting needs to be carried out in consideration of the worst situation of environment and a margin of aging deterioration. It is very hard to run operating patterns in environment of after shipment.

Japanese Patent Application Laid-Open No. 2013-37472 discloses a method for setting a power source voltage applied to a chip, and describes that a ratio of gate delay of the critical path to wiring delay is calculated from layout data of the chip, and the power source voltage applied to the chip is set in consideration of the ratio.

However, the method for adjusting voltage mentioned above has a following issue.

In a test in the circuit using the critical path or actual operations disclosed in Japanese Patent Application Laid-Open No. 2013-37472, only noise at a particular timing can be tested. Therefore, there is an issue that the voltage adjustment is not necessarily carried out on the basis of the test using noise with the worst value.

SUMMARY

An object of the present invention is to provide a voltage adjusting circuit and a method for adjusting voltage that enable setting of a power source voltage with high accuracy.

To achieve the above-described object, a voltage adjusting circuit according to the present invention includes: a variable current generating means that generates a variable current to be supplied to a power source line; a decision voltage generating means that generates a decision voltage by using a power source voltage of the power source line; and a power source noise detecting means that detects power source noise of the power source line on the basis of the power source voltage of the power source line and the decision voltage.

A method for adjusting voltage according to the present invention includes: generating a decision voltage by using a power source voltage of a power source line; supplying a variable current to the power source line; and detecting power source noise of the power source line on the basis of the power source voltage of the power source line, to which the variable current is supplied, and the decision voltage.

BRIEF DESCRIPTION OF THE DRAWINGS

Exemplary features and advantages of the present invention will become apparent from the following detailed description when taken with the accompanying drawings in which.

EXAMPLE EMBODIMENT

Preferred example embodiments of the present invention are described in detail by referring to drawings. Before more specific example embodiments of the present invention are described, example embodiments of a voltage adjusting circuit and a method for adjusting voltage representing a broadest concept of the present invention are described.

Figure 1:
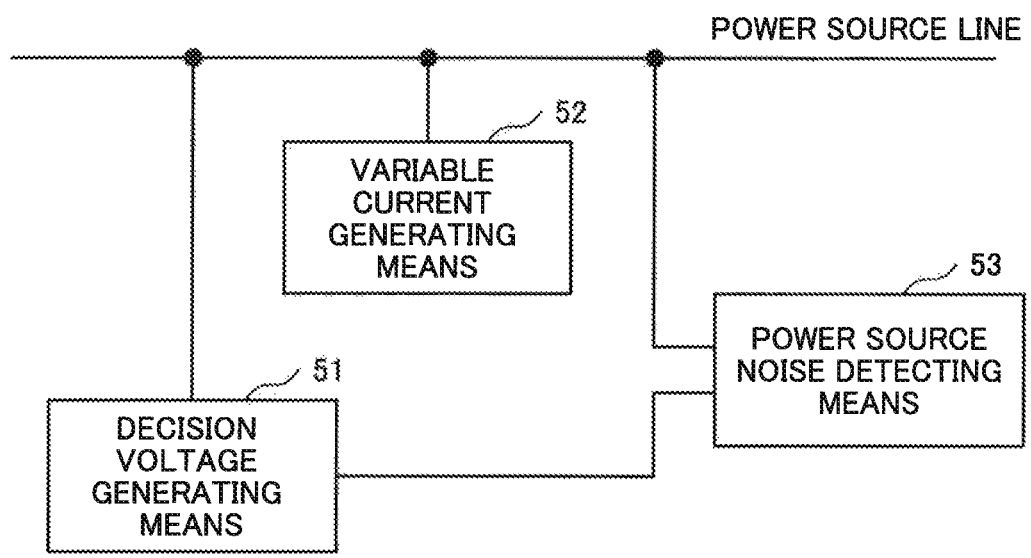
FIG. 1 is a block diagram illustrating a voltage adjusting circuit according to a broadest concept example embodiment of the present invention.

FIG. 1 is a block diagram illustrating a voltage adjusting circuit according to a broadest concept example embodiment of the present invention. A voltage adjusting circuit 50 in FIG. 1 includes a decision voltage generating means 51 as an example of a decision voltage generating unit, a variable current generating means 52 as an example of a variable current generating unit, and a power source noise detecting means 53 as an example of a power source noise detecting unit. The variable current generating means 52 generates a variable current to be supplied to a power source line. The decision voltage generating means 51 generates a decision voltage by using a power source voltage of the power source line. The power source noise detecting means 53 detects power source noise of the power source line on basis of the power source voltage of the power source line and the decision voltage. According to the present example embodiment, the power source voltage can be set with high accuracy. More specific example embodiments on the voltage adjusting circuit and the method for adjusting voltage of the present invention are described below.

First Example Embodiment

Figure 2:
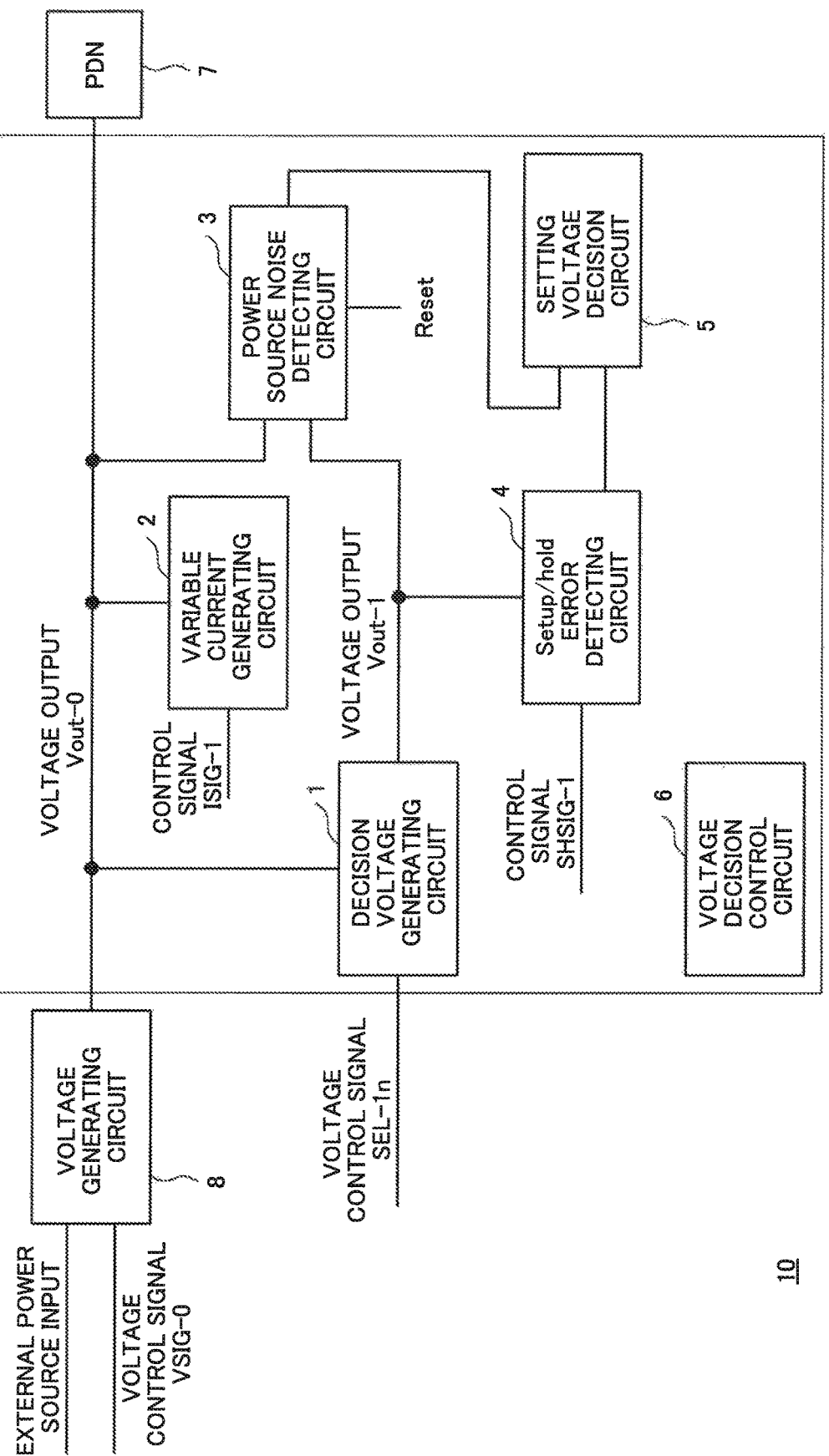
FIG. 2 is a block diagram illustrating a voltage adjusting circuit of a first example embodiment of the present invention.

A voltage adjusting circuit and a method for adjusting voltage of according to the first example embodiment of the present invention are described. FIG. 2 is a block diagram illustrating a voltage adjusting circuit of the first example embodiment of the present invention.

Configuration of First Example Embodiment

A voltage adjusting circuit 10 in FIG. 2 is a voltage adjusting circuit that adjusts a power source voltage. The voltage adjusting circuit 10 in FIG. 2 receives, as an input, the power source voltage generated by a voltage generating circuit 8, and a power source line thereof is connected to a Power Delivery Network (PDN) 7. The voltage generating circuit 8 includes a Voltage Regulator Module (VRM), a regulator circuit of a semiconductor integrated circuit, or the like, receives an input of an external power source, and is controlled by a voltage control signal VSIG-0.

The voltage adjusting circuit 10 in FIG. 2 includes a decision voltage generating circuit 1, a variable current generating circuit 2, a power source noise detecting circuit 3, a setup/hold error detecting circuit 4, a setting voltage decision circuit 5 and a voltage decision control circuit 6.

The decision voltage generating circuit 1 is controlled by a voltage control signal SEL-1n, receives a power source voltage generated by the voltage generating circuit 8 as an input, and generates a fixed voltage by using the power source voltage. The variable current generating circuit 2 is controlled by a control signal ISIG-1 and adds a variable current to the power source line connected to the PDN 7. The power source noise detecting circuit 3 receives, as inputs, a voltage of PDN 7 and a decision voltage generated by the decision voltage generating circuit 1, and compares the two voltages.

The setup/hold error detecting circuit 4 operates by using the decision voltage generated by the decision voltage generating circuit 1 as a power source. The setup/hold error detecting circuit 4 is controlled by a control signal SHSIG-1, and determines a setup error and a hold error.

The setting voltage decision circuit 5 determines a setting voltage on the basis of output results of the power source noise detecting circuit 3 and the setup/hold error detecting circuit 4, and determines a setting value of the power source voltage of the voltage generating circuit 8. The voltage decision control circuit 6 controls each circuit included in the voltage adjusting circuit 10 of FIG. 2.

Specific Example of Decision Voltage Generating Circuit 1

Figure 3:
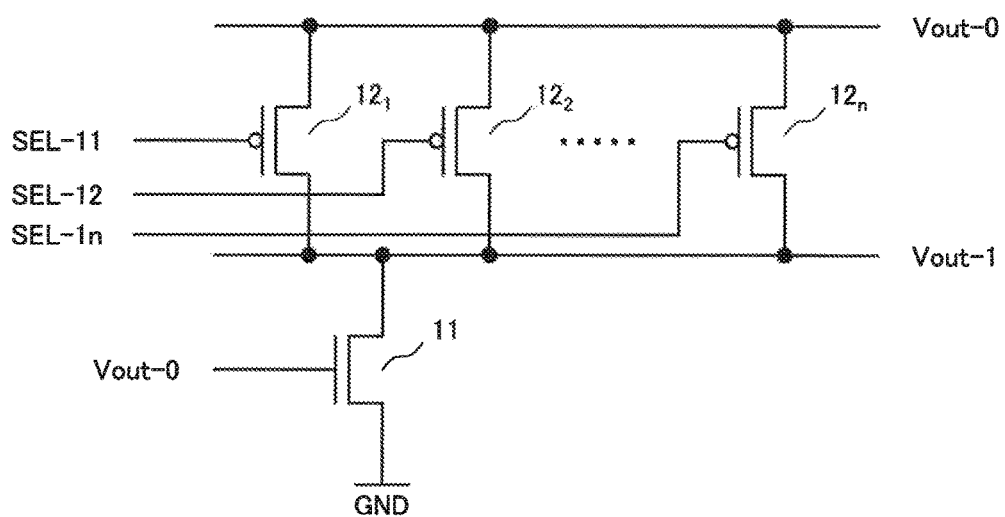
FIG. 3 is a circuit diagram illustrating an example of a decision voltage generating circuit in FIG. 2.

FIG. 3 is a circuit diagram illustrating an example of the decision voltage generating circuit 1 in FIG. 2. The decision voltage generating circuit 1 in FIG. 3 includes n number of Pch transistors 12 ($12_1$ to $12_n$) and an Nch transistor 11 whose source-drain paths are connected in series between a power source voltage Vout-0 and a GND. The power source voltage Vout-0 is applied to a gate of the Nch transistor 11. Selection signals SEL-11 to SEL-1n are supplied to gates of the Pch transistor $12_1$ to $12_n$, respectively.

The decision voltage generating circuit 1 generates a decision voltage Vout-1 by dividing ON resistance of the n number of Pch transistors 12 ($12_1$ to $12_n$) and the Nch transistor 11, with respect to the power source voltage Vout-0 generated by the voltage generating circuit 8. A voltage value of the decision voltage Vout-1 is controlled, in a variable manner, by changing the number of ON-state Pch transistors 12 by using the selection signals SEL-11 to SEL-1n. Thereby the voltage adjusting circuit 10 of the present example embodiment can widely carry out power source voltage adjustment from coarse adjustment to highly accurate adjustment. In following descriptions, the power source voltage Vout-0 may be written as a "voltage Vout-O", and the decision voltage Vout-1 may be written as a "voltage Vout-1".

Specific Example of Variable Current Generating Circuit 2

Figure 4:
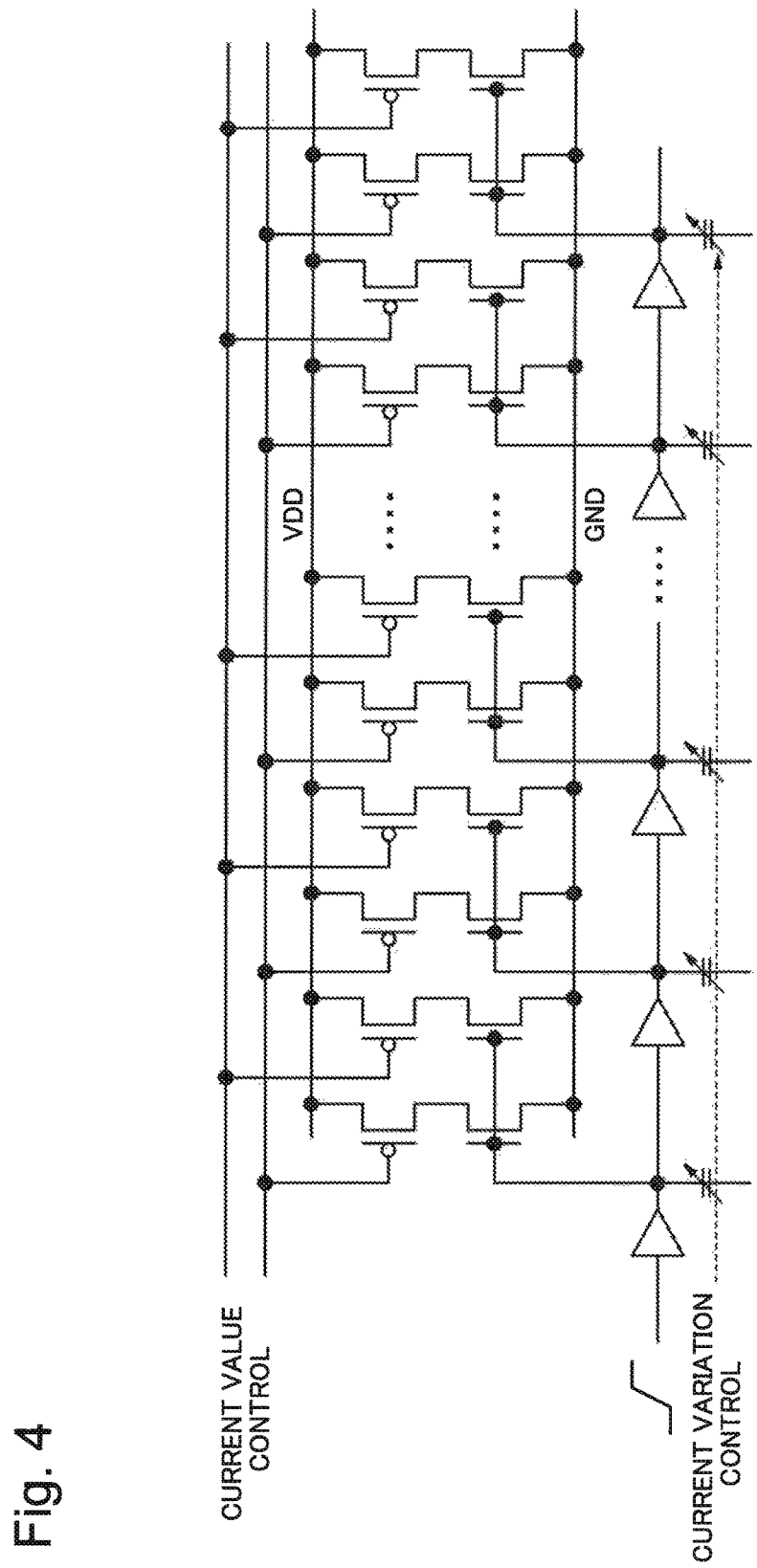
FIG. 4 is a circuit diagram illustrating an example of a variable current generating circuit in FIG. 2.

FIG. 4 is a circuit diagram illustrating an example of the variable current generating circuit 2 in FIG. 2. The variable current generating circuit 2 having a circuit configuration shown in FIG. 4 is disclosed in Japanese Patent Application Laid-Open No. 2015-69993. The variable current generating circuit 2 in FIG. 4 includes a large number of Pch transistors and a large number of Nch transistors whose source-drain paths are connected in series between a VDD and a GND. A current is generated by a through current which flows the Pch transistor and the Nch transistor. An ON-state and an OFF-state of the Pch transistor is controlled by a current value control signal which is applied to a gate. In FIG. 4, a plurality of drivers is connected in series. The drivers are connected to gates of the Nch transistors. An output side of each driver is connected to a capacitor. A monotonously increasing variable current is generated by combining current variation control by the drivers and current value control by the Pch transistors.

When variable current sweeping over the PDN 7 is carried out by using the variable current generating circuit 2, not only noise of a frequency band related to the circuit operation pattern, but also noise of all frequency bands can be generated exhaustively.

Specific Example of Power Source Noise Detecting Circuit 3

Figure 5:
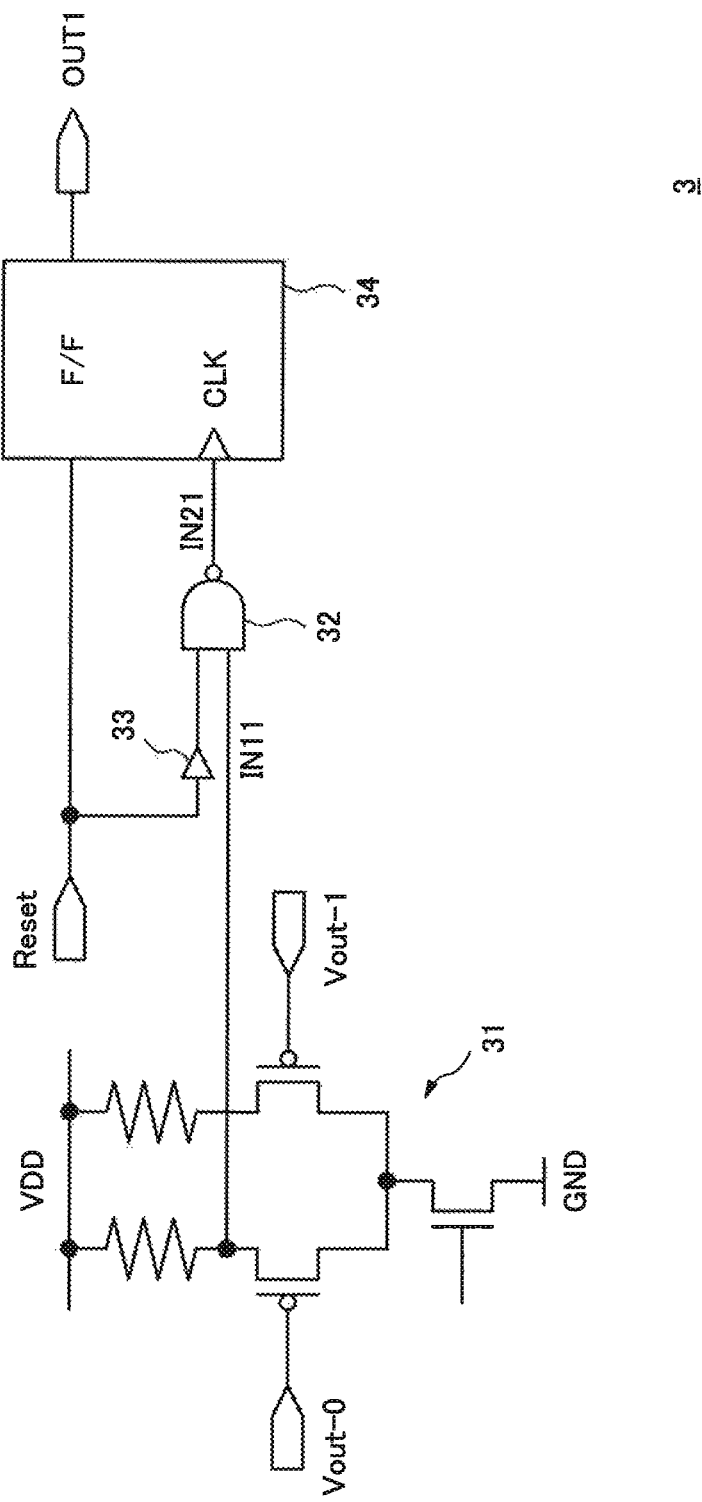
FIG. 5 is a circuit diagram illustrating an example of a power source noise detecting circuit in FIG. 2.

FIG. 5 is a circuit diagram illustrating an example of the power source noise detecting circuit 3 in FIG. 2. The power source noise detecting circuit 3 in FIG. 5 includes a differential amplifier 31, a NAND circuit 32, a delay circuit 33, and a flip-flop 34 (F/F 34).

With regard to the relation between the voltage Vout-0 and the decision voltage Vout-1, the voltage Vout-0 is higher than the decision voltage Vout-1 in the initial state. Thus, "1" is output to IN 11. In this state, when a reset signal is changed from "1" to "0" to "1", a clock enters IN 21 once, data "0" of the reset signal is written into the F/F 34, and "0" is outputted from an output OUT 1. Next, when the reset signal is in a state of "1" and the voltage Vout-0 is lower than the decision voltage Vout-1, the IN 11 is changed from "1"

to "0" and the IN21 is changed from "0" to "1". After that, since the voltage Vout-0 becomes higher when noise is suppressed and the condition becomes stable, the IN 11 is changed from "0" to "1" and the IN21 is changed from "1" to "0". According to these operations, data "1" of the reset signal is written into the F/F 34 and "1" is outputted from the OUT 1.

Figure 6:
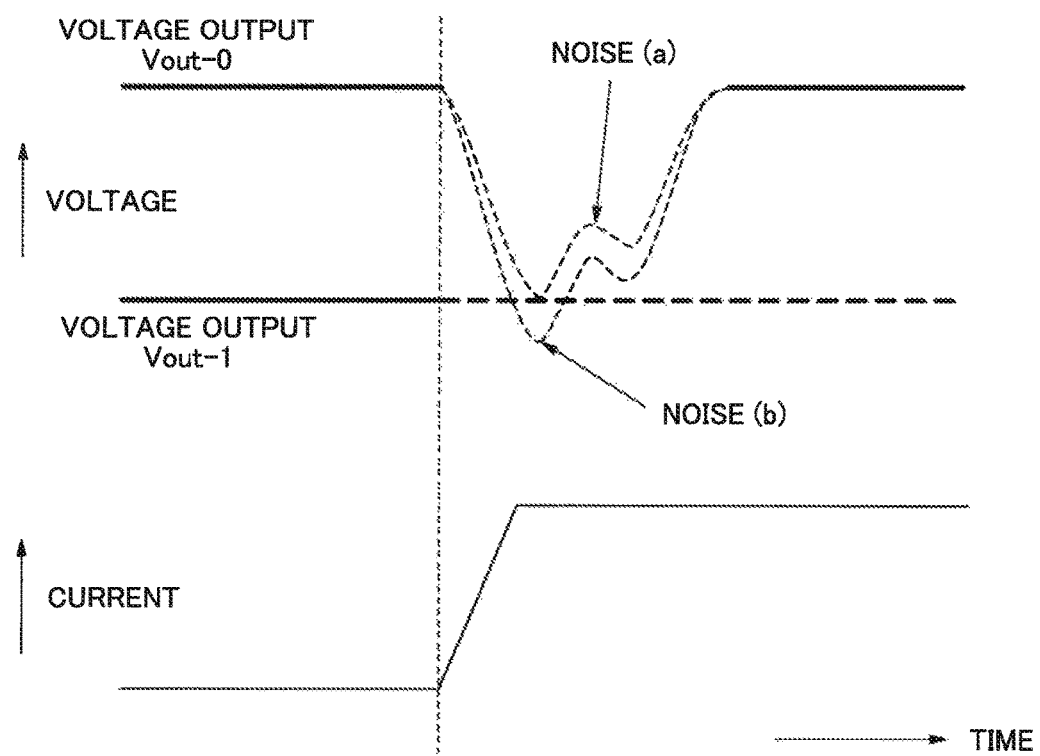
FIG. 6 is a graph illustrating an example of a relation between a variable current generated by the variable current generating circuit and change of a power source voltage with respect to a decision voltage.

FIG. 6 is a graph illustrating an example of a relation between a variable current generated by the variable current generating circuit 2 and change of the power source voltage Vout-0 with respect to the decision voltage Vout-1. FIG. 6 illustrates a timing chart of the power source voltage Vout and the variable current on the PDN 7. As shown in FIG. 6, when the current varies, the power source voltage Vout-0 varies at that timing. An amount of the voltage variation varies depending on a structure of the PDN 7, variation of members, environment of operation, and the like even though variation of a current generated by the variable current generating circuit 2 is constant. For example, in voltage variation like noise (a) in FIG. 6, since the power source voltage Vout-0 does not fall below the decision voltage Vout-1, an output value of the F/F 34 in FIG. 5 does not vary and stays "0". In voltage variation like noise (b) in FIG. 6, since the power source voltage Vout-0 falls below the decision voltage Vout-1, a clock signal CLK is applied to the F/F 34 in FIG. 5, and "1" is written into the F/F 34. In this way, the power source noise detecting circuit 3 detects that the noise is large.

Specific Example of Setup/Hold Error Detecting Circuit 4

Figure 7:
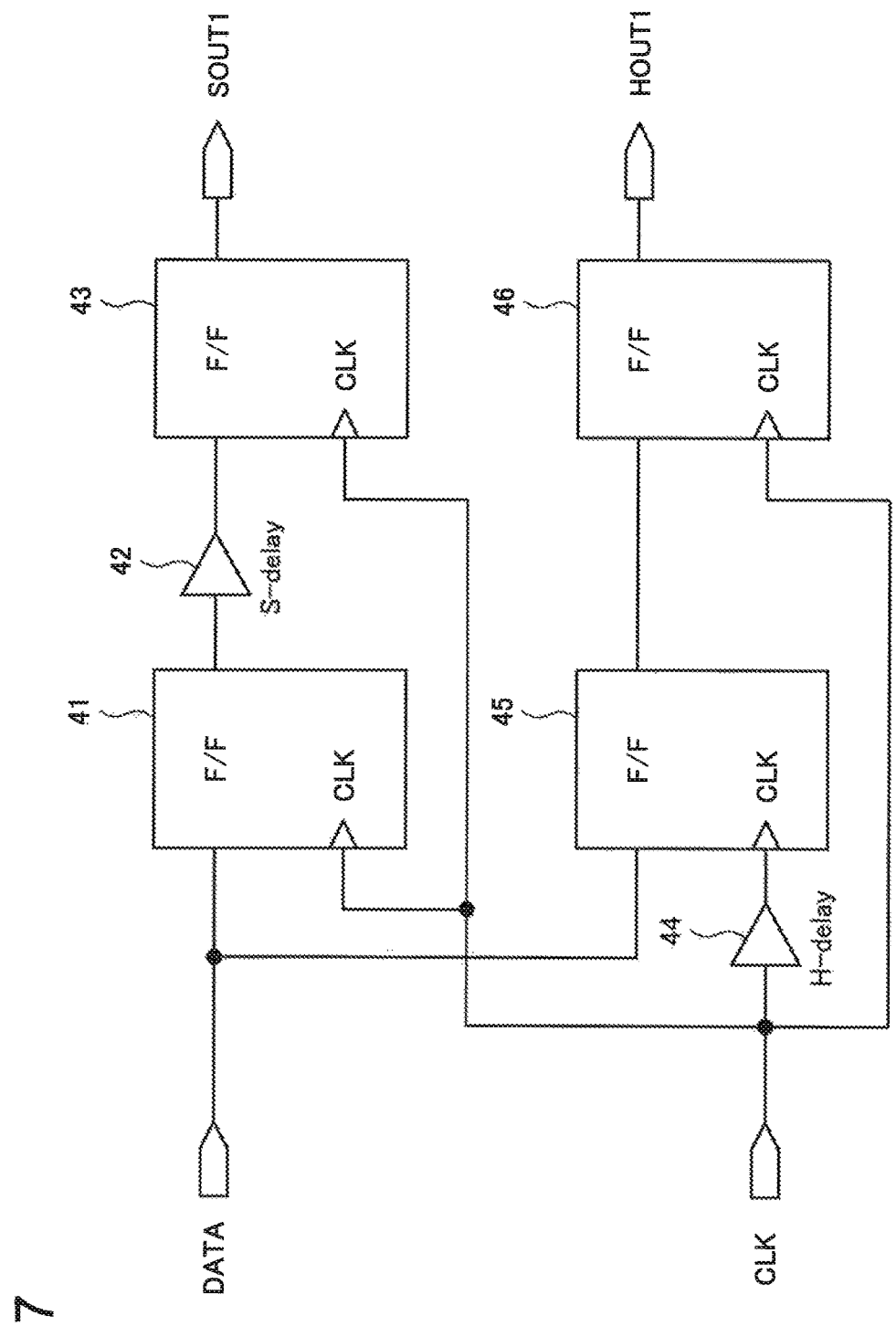
FIG. 7 is a circuit diagram illustrating an example of a setup/hold error detecting circuit in FIG. 2.

FIG. 7 is a circuit diagram illustrating an example of the setup/hold error detecting circuit 4 in FIG. 7. The setup/hold error detecting circuit 4 in FIG. 2 includes a flip-flop 41 (F/F 41), a flip-flop 43 (F/F 43), a flip-flop 45 (F/F 45), and a flip-flop 46 (F/F 46). The setup/hold error detecting circuit 4 in FIG. 7 further includes a delay circuit 42 with a delay amount S-delay, and a delay circuit 44 with a delay amount H-delay.

A frequency of an operation clock signal CLK as an input and a value of the delay amount S-delay for setup are set in advance. The power source voltage is operated at the voltage Vout-1, and whether or not F/F-to-F/F transferring by the operation clock signal CLK is carried out is determined using an output SOUT1 of the setup/hold error detecting circuit 4. Similarly, by determining whether or not F/F-to-F/F transferring is carried out is determined using an output HOUT1 of the setup/hold error detecting circuit 4, whether or not setup/hold is satisfied at the voltage Vout-1 is determined.

In above operations, by setting the power source voltage Vout-O which satisfies the voltage Vout-1 satisfying setup/hold operations and in which noise does not fall below the decision voltage Vout-1, the power source voltage in consideration of variation of the PDN 7 can be set.

In the setting voltage decision circuit 5, if the voltage Vout-1 which satisfies setup/hold operations or the power source voltage Vout-O in which noise does not fall below the decision voltage Vout-1 is not detected, data which changes the voltage value is sent to the voltage generating circuit 8 and a voltage value generated by the voltage generating circuit 8 is adjusted. After that, by carrying out the power source voltage decision above described again, a desired voltage value can be set.

Advantageous Effect of First Example Embodiment

According to the present example embodiment, since the power source voltage is adjusted in consideration of manufacturing variation of components or characteristics variation due to environment conditions with respect to products, an optimum power source voltage setting in which margin is reduced can be performed and power consumption can be reduced. Since the power source voltage is individually set in consideration of variation in each apparatus, there is a considerable reduction effect of power consumption. Further, since hold errors are also detected, there is an advantageous effect that a circuit scale can be decreased and low power consumption is realized by reducing a margin of a hold compensation circuit of a semiconductor integrated circuit.

Further low power consumption is realized as described below.

(1) Actual operation patters are not necessary for noise generation, and the adjustment may be performed easily in a short time.

(2) It is possible to detect noise generation amount in consideration of variation of the PDN 7, and an optimum voltage value can be obtained.

(3) When a test is conducted in actual operations in a circuit using a critical path, only noise at a certain timing can be tested. The test is not necessarily a test of noise with the worst value. The variable current generating circuit 2 of the present example embodiment can include all frequency bands, and set the power source voltage with high accuracy.

(4) Since the power source voltage can be adjusted during actual operations, not before shipment, an optimum voltage can be set in accordance with environment variation or aging deterioration of components.

(5) The power source voltage can be widely adjusted from coarse adjustment to highly accurate adjustment by controlling ON resistance of a transistor of the variable current generating circuit 2.

(6) Since hold circuit error detection is also performed, an error at a higher voltage can be detected as well according to processes. Since operations are compensated by this detection function, a redundant hold compensation circuit is not necessary, a circuit scale can be decreased and power consumption can be reduced.

Second Example Embodiment

Figure 8:
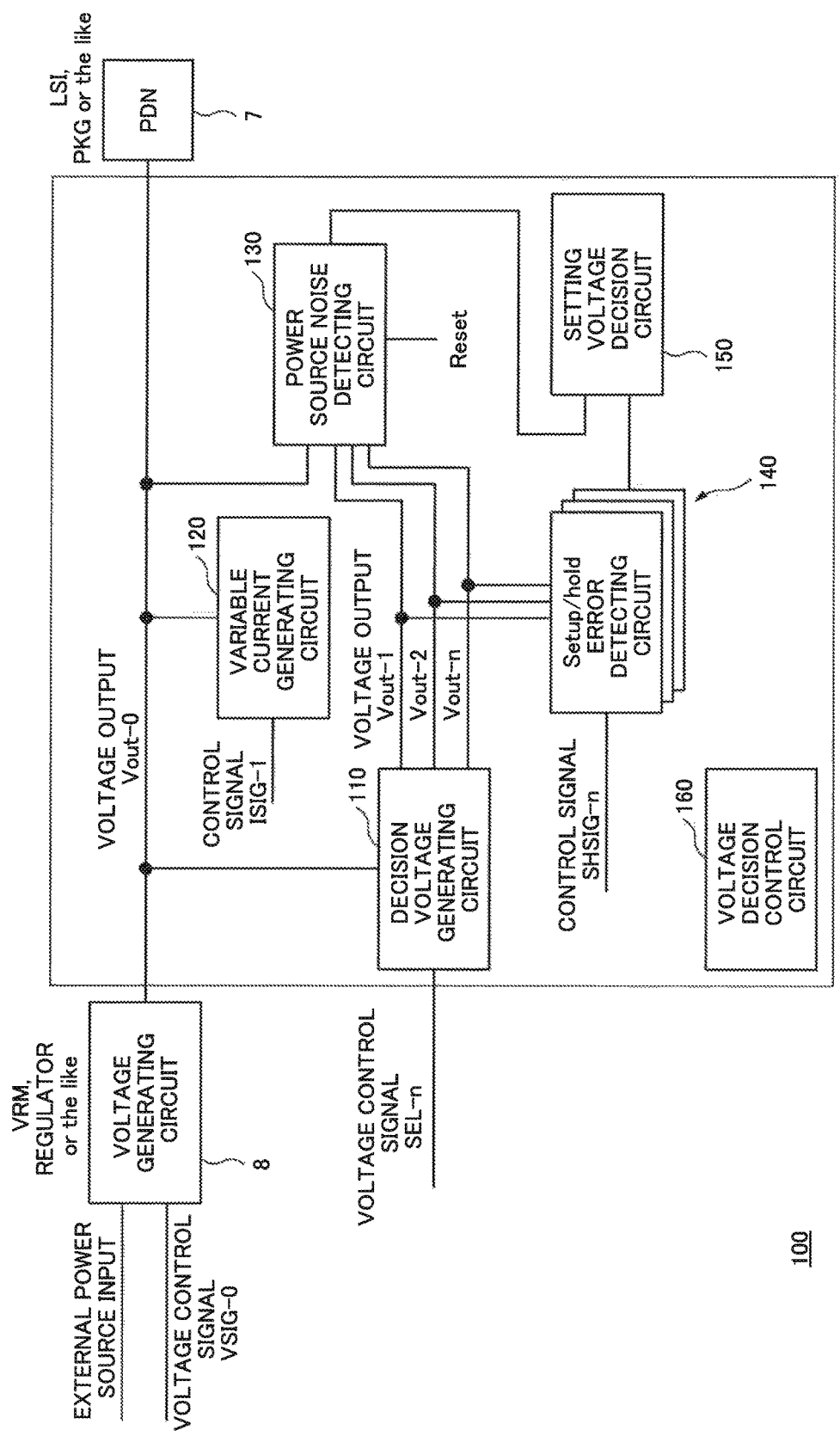
FIG. 8 is a block diagram illustrating a voltage adjusting circuit of a second example embodiment of the present invention.

A voltage adjusting circuit and a method for adjusting voltage according to the second example embodiment of the present invention are described. In the present example embodiment, each of the decision voltage generating circuit and the power source noise detecting circuit in the voltage adjusting circuit of the first example embodiment has a multiple structure. FIG. 8 is a block diagram illustrating the voltage adjusting circuit of the second example embodiment of the present invention.

Configuration of Second Example Embodiment

A voltage adjusting circuit 100 of FIG. 8 is a voltage adjusting circuit that adjusts a power source voltage, like the first example embodiment. The voltage adjusting circuit 100 in FIG. 8 receives, as an input, a power source voltage generated by the voltage generating circuit 8, and a power source line thereof is connected to the PDN 7, as in the first example embodiment. The voltage generating circuit 8 includes a VRM, a regulator circuit of a semiconductor integrated circuit, and the like, receives an input of an external power source, and is controlled by the voltage control signal VSIG-0.

The voltage adjusting circuit 100 in FIG. 8 includes a decision voltage generating circuit 110, a variable current generating circuit 120, a power source noise detecting circuit 130, a setup/hold error detecting circuit 140, a setting voltage decision circuit 150, and a voltage decision control circuit 160.

The decision voltage generating circuit 110 is controlled by the voltage control signal SEL-n, receives, as an input, a power source voltage generated by the voltage generating circuit 8, and generates a plurality of fixed voltages by using the power source voltage. The voltage generating circuit 8 of FIG. 8 generates n number of voltages Vout-1 to Vout-n.

The variable current generating circuit 120 adds a variable current to the power source line connected to the PDN 7. The power source noise detecting circuit 130 receives, as inputs, a voltage of the PDN 7 and the plurality of decision voltages Vout-1 to Vout-n generated by the decision voltage generating circuit 110, and compares the voltages. The setup/hold error detecting circuits 140 operate at the decision voltages Vout-1 to Vout-n generated by the decision voltage generating circuits 110, as power sources. The setup/hold error detecting circuits 140 are controlled by a control signal SHSIG-n and determine a setup error and a hold error. In other words, the setup/hold error detecting circuit 140 of the present example embodiment are connected so as to operate at corresponding power source voltages Vout-1 to Vout-n, respectively. The setting voltage decision circuit 150 determines setting values of the respective voltages Vout-1 to Vout-n on the basis of output results of the power source noise detecting circuit 130 and the setup/hold error detecting circuit 140 and determines a setting value of a power source voltage of the voltage generating circuit 8. The voltage decision control circuit 160 controls each circuit in the voltage adjusting circuit 100 of FIG. 8.

Specific Example of Decision Voltage Generating Circuit 110

Figure 9:
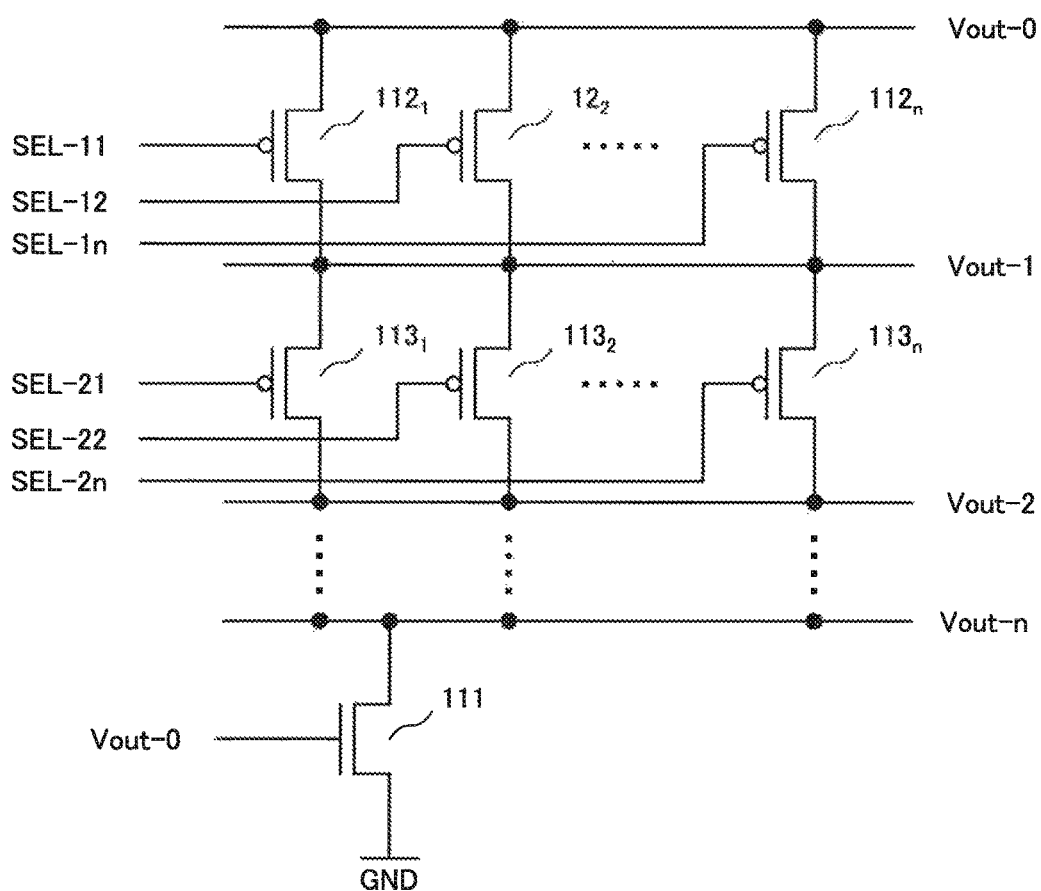
FIG. 9 is a circuit diagram illustrating an example of a decision voltage generating circuit in FIG. 8.

FIG. 9 is a circuit diagram illustrating an example of the decision voltage generating circuit 110 in FIG. 8. The decision voltage generating circuit 110 in FIG. 9 has n number of outputs from the voltage Vout-1 to Vout-n. The decision voltage generating circuit 110 in FIG. 9 includes n×n Pch transistors 112 (Pch transistors $112_1$ to $112_n$), Pch transistors 113 (Pch transistors $113_1$ to $113_n$), . . . , and an Nch transistor 111 whose source-drain paths are connected in series between a voltage Vout-0 and a GND. The voltage Vout-0 is applied to the gate of the Nch transistor 111. The selection signals SEL-11 to SEL-1n are supplied to the gates of the Pch transistors $112_1$ to $112_n$, respectively. The selection signals SEL-21 to SEL-2n are supplied to the gates of the Pch transistors $113_1$ to $113_n$, respectively.

With respect to the voltage Vout-0 generated by the voltage generating circuit 8, the decision voltage generating circuit 110 generates n decision voltages Vout-1 to Vout-n by dividing ON resistance of the n×n Pch transistors 112 (Pch transistors $112_1$ to $112_n$), Pch transistors 113 (Pch transistors $113_1$ to $113_n$), . . . , and the Nch transistor 111.

The voltage value of the decision voltage Vout-1 is controlled in a variable manner by controlling the number of the Pch transistors 112 which are turned on by the selection signals SEL-11 to SEL-1n. The voltage value of the decision voltage Vout-2 is controlled in a variable manner by controlling the number of the Pch transistors 113 which are turned on by the selection signals SEL-21 to SEL-2n. Thereby the voltage adjusting circuit 100 of the present example embodiment can widely carry out power source voltage adjustment from coarse adjustment to highly accurate adjustment.

A resistance value between the voltage Vout-0 and the decision voltage Vout-1 is set by the selection signals SEL-11 to SEL-1n, and a resistance value between the decision voltage Vout-1 and the decision voltage Vout-2 is set by the selection signal SEL-21 to SEL-2n. In this way, the decision voltage generating circuit 110 generates the n decision voltages Vout-1 to Vout-n. Setting the resistance value at a larger value makes coarse voltage adjustment possible, and setting the resistance at a smaller value makes more accurate voltage adjustment possible.

Specific Example of Power Source Noise Detecting Circuit 130

Figure 10:
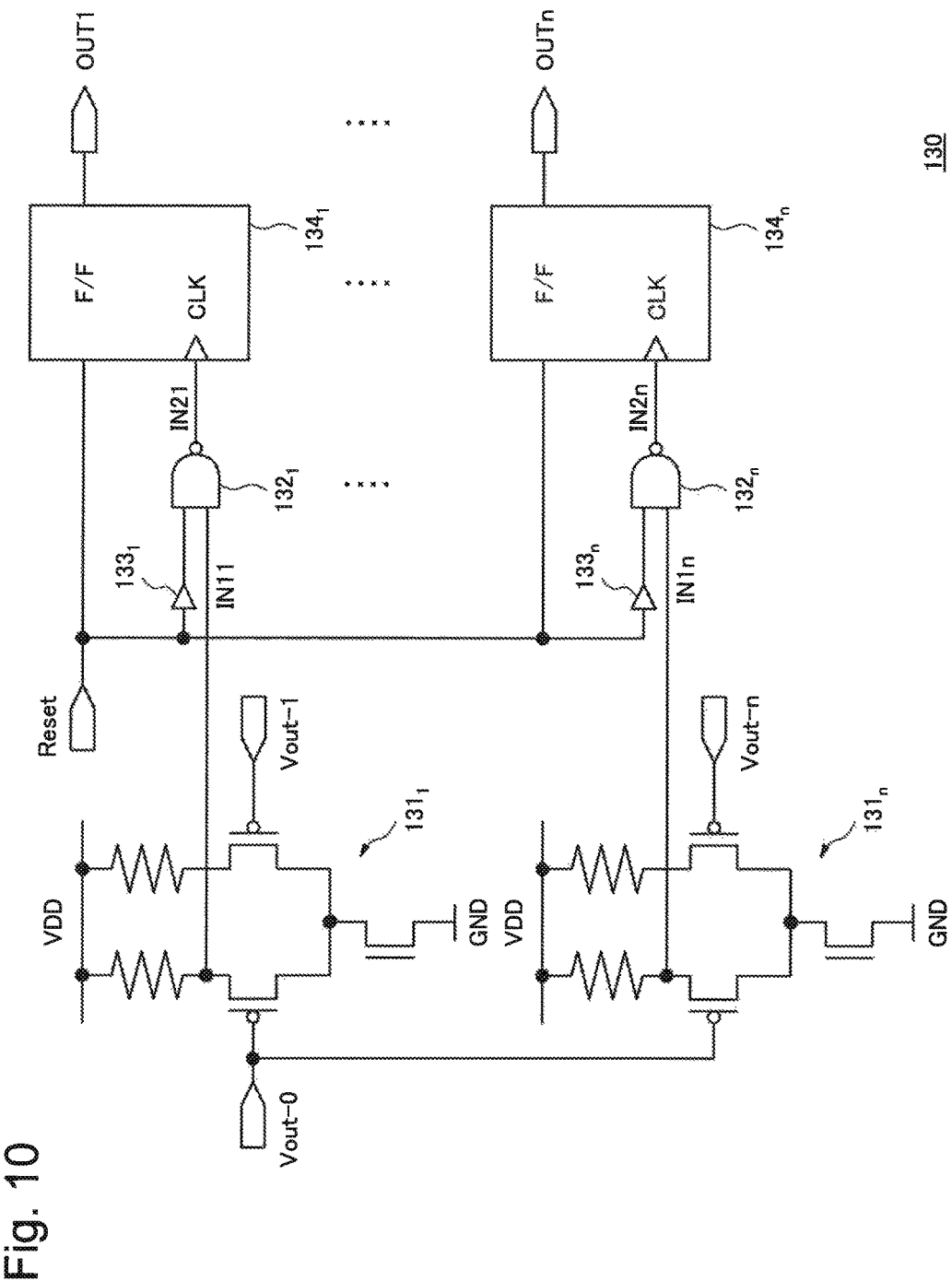
FIG. 10 is a circuit diagram illustrating an example of a power source noise detecting circuit in FIG. 8.

FIG. 10 is a circuit diagram illustrating an example of the power source noise detecting circuit 130 in FIG. 8. The power source noise detecting circuit 130 of FIG. 10 has n number of inputs, the decision voltage Vout-1 to the decision voltage Vout-n. The power source noise detecting circuit 130 of FIG. 10 includes n number of differential amplifiers 131 (differential amplifiers $131_1$ to $131_n$), n number of NAND circuits 132 (NAND circuits $132_1$ to $132_n$), n number of delay circuits 133 (delay circuits $133_1$ to $133_n$), and n number of flip-flops 134 (flip-flops $134_1$ to $134_n$).

The power source noise detecting circuit 130 of FIG. 10 compares each voltage value of the decision voltages Vout-1 to Vout-n with the power source voltage Vout-0 of the power source line, and noise detection and outputting to OUT1 to OUTn are carried out, like FIG. 5.

Since a plurality of power source voltages can be determined at the same time by the above operations, short-time measurement can be carried out. Even if a voltage value which does not become an error in the setup/hold error detecting circuit 140 does not accord with a voltage value which does not become an error in the power source noise detecting circuit 130, the voltages can be made to match each other with high accuracy in a short-time by calculating an adjustment amount of the power source using the number of taps of the difference thereof.

Advantageous Effect of Second Example Embodiment

According to the present example embodiment, like the first example embodiment, since the power source voltage is adjusted in consideration of manufacturing variation of components or characteristics variation due to environment conditions with respect to products, optimum power source voltage setting in which margin is reduced can be performed and power consumption can be reduced. Since the power source voltage is individually set in consideration of variation in each apparatus, power consumption can be greatly reduced. Since a hold error is detected, a circuit scale can be decreased and low power consumption is realized by reducing a margin of a hold compensation circuit in a semiconductor integrated circuit.

As in the first example embodiment, the advantageous effects (1) to (6) are obtained. Further according to the present example embodiment, since the decision voltage generating circuit and the decision circuit have a multiple structure, more accurate short-time voltage decision is possible compared with the first example embodiment.

Although the preferred example embodiments of the present invention are described, the present invention is not limited to the above example embodiments. Various modifications are possible in the scope of the present invention described in claims, and such modifications are included in the scope of the present invention. The invention provides a voltage adjusting circuit and a method for adjusting voltage which are useful on a package in which a semiconductor integrated circuit is operated, such as a printed board, a power source, a LSI, a capacitor, and the like.

A part or all the above example embodiment may be described as following supplementary notes, but is not limited to the following supplementary notes.

(Supplementary Note 1)

A voltage adjusting circuit, including a variable current generating means for generating a variable current to be supplied to a power source line, a decision voltage generating means for generating a decision voltage by using a power source voltage of the power source line, and a power source noise detecting means for detecting power source noise of the power source line on the basis of the power source voltage of the power source line and the decision voltage.

(Supplementary Note 2)

The voltage adjusting circuit of the supplementary note 1, wherein the decision voltage generating means generates the decision voltage by dividing ON resistance of a plurality of transistors being connected in series.

(Supplementary Note 3)

The voltage adjusting circuit of the supplementary note 1 or 2, wherein the decision voltage generating means generates a plurality of decision voltages that are different from each other by using the power source voltage of the power source line.

(Supplementary Note 4)

The voltage adjusting circuit of the supplementary note 3, wherein the power source noise detecting means detects the power source noise of the power source line on the basis of the power source voltage of the power source line and the plurality of decision voltages.

(Supplementary Note 5)

The voltage adjusting circuit of any one of the supplementary notes 1 to 4, wherein a voltage generating circuit that generates the power source voltage of the power source line is controlled in response to a detection result of the power source noise detected by the power source noise detecting means.

(Supplementary Note 6)

The voltage adjusting circuit of any one of the supplementary notes 1 to 5, further including a setup/hold error detecting circuit that is operated by using the decision voltage, as a power source voltage, and detects at least one of a setup error and a hold error.

(Supplementary Note 7)

A method for adjusting voltage, including generating a decision voltage by using a power source voltage of a power source line, supplying a variable current to the power source line, and detecting power source noise of the power source line on the basis of the power source voltage of the power source line, to which the variable current is supplied, and the decision voltage.

(Supplementary Note 8)

The method for adjusting voltage of the supplementary note 7, wherein the decision voltage is generated by dividing ON resistance of a plurality of transistors that are connected in series.

(Supplementary Note 9)

The method for adjusting voltage of the supplementary note 7 or 8, wherein a plurality of decision voltages that are different from each other are generated by using the power source voltage of the power source line, and the power source noise of the power source line is detected on the basis of the power source voltage of the power source line, to which the variable current is supplied, and the plurality of decision voltages.

(Supplementary Note 10)

The method for adjusting voltage of any one of the supplementary notes 7 to 9, wherein a voltage generating circuit that generates the power source voltage of the power source line is controlled in response to a detection result of the power source noise.

(Supplementary Note 11)

The method for adjusting voltage of any one of the supplementary notes 7 to 10, wherein at least one of a setup error and a hold error is detected by using the decision voltage, as a power source voltage.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A voltage adjusting circuit, comprising:
   a voltage generating circuit that generates a power source voltage of a power source line;
   a variable current generating unit that generates a monotonously increasing variable current to be supplied to the power source line;
   a decision voltage generating unit that generates a decision voltage by using the power source voltage of the power source line;
   a power source noise detecting unit that detects power source noise of the power source line based on the power source voltage of the power source line and the decision voltage; and
   a setting voltage decision circuit that decides a setting value for the power source voltage, based on a detection result by the power source noise detecting unit.

2. The voltage adjusting circuit of claim 1, wherein the decision voltage generating unit generates the decision voltage by dividing ON resistance of a plurality of transistors being connected in series.

3. The voltage adjusting circuit of claim 1, wherein the decision voltage generating unit generates a plurality of decision voltages that are different from each other by using the power source voltage of the power source line.

4. The voltage adjusting circuit of claim 3, wherein the power source noise detecting unit detects the power source noise of the power source line based on the power source voltage of the power source line and the plurality of decision voltages.

5. The voltage adjusting circuit of claim 1, wherein the voltage generating circuit is controlled in response to a detection result of the power source noise detected by the power source noise detecting unit.

6. The voltage adjusting circuit of claim 1, further comprising:
   a setup/hold error detecting circuit that functions by using the decision voltage, as the power source voltage, and detects at least one of a setup error and a hold error.

7. A method for adjusting voltage, comprising:
generating a power source voltage of a power source line;
generating a decision voltage by using a power source voltage of a power source line;
supplying a monotonously increasing variable current to the power source line;
detecting power source noise of the power source line based on the power source voltage of the power source line, to which the variable current is supplied, and the decision voltage; and
deciding a setting value for the power source voltage, based on a detection result by the detecting the power source noise.

8. The method for adjusting voltage of claim 7, wherein the decision voltage is generated by dividing ON resistance of a plurality of transistors that are connected in series.

9. The method for adjusting voltage of claim 7, wherein a plurality of decision voltages that are different from each other are generated by using the power source voltage of the power source line, and the power source noise of the power source line is detected based on the power source voltage of the power source line, to which the variable current is supplied, and the plurality of decision voltages.

10. The method for adjusting voltage of claim 7, wherein a voltage generating circuit that generates the power source voltage of the power source line is controlled in response to a detection result of the power source noise.

11. The method for adjusting voltage of claim 7, wherein at least one of a setup error and a hold error is detected by using the decision voltage, as the power source voltage.

* * * * *